No. 741,258. PATENTED OCT. 13, 1903.
W. A. LAWRENCE.
ART OF EXTRACTING RUBBER WITHOUT SOLVENTS.
APPLICATION FILED AUG. 20, 1902.
NO MODEL. 2 SHEETS—SHEET 1.
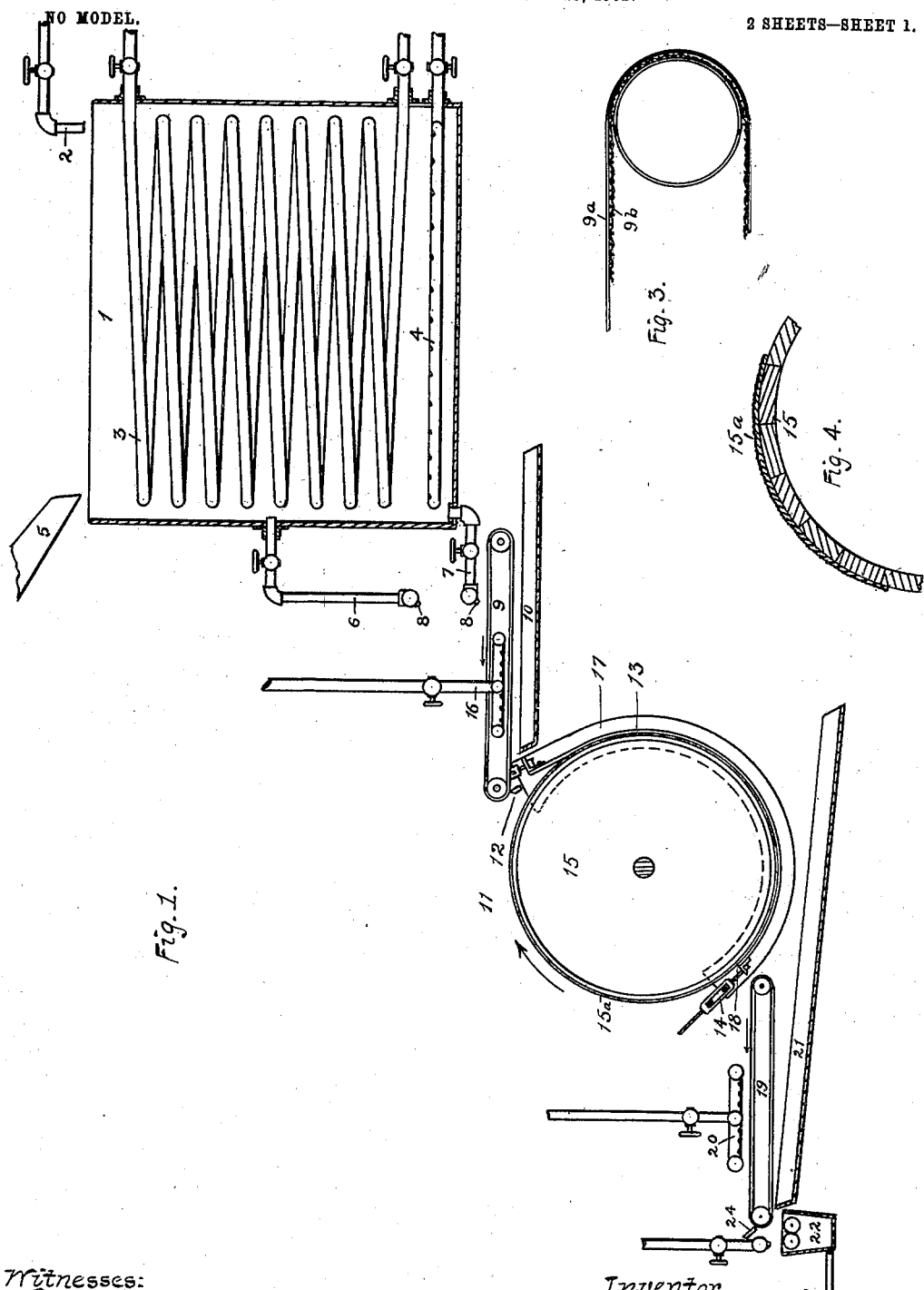
Witnesses:
Inventor
Wm. A. Lawrence.
by
Betts Betts Sheffield Betts
Attorneys

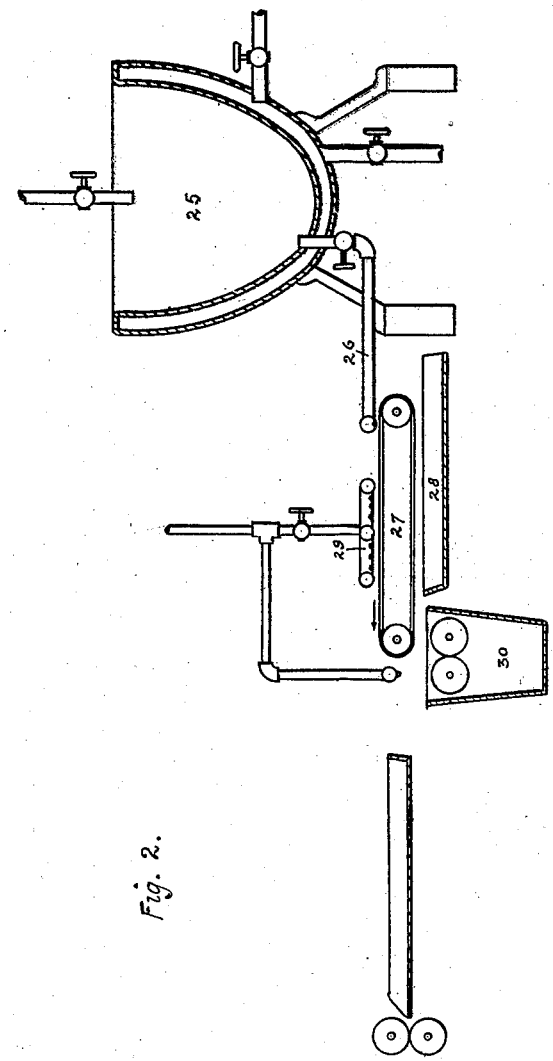

No. 741,258. Patented October 13, 1903.

UNITED STATES PATENT OFFICE.

WILLIAM A. LAWRENCE, OF NEW YORK, N. Y., ASSIGNOR TO CONTINENTAL RUBBER COMPANY, OF JERSEY CITY, NEW JERSEY, A CORPORATION OF NEW JERSEY.

ART OF EXTRACTING RUBBER WITHOUT SOLVENTS.

SPECIFICATION forming part of Letters Patent No. 741,258, dated October 13, 1903.

Application filed August 20, 1902. Serial No. 120,368. (No specimens.)

*To all whom it may concern:*

Be it known that I, WILLIAM A. LAWRENCE, a citizen of the United States, and a resident of the borough of Queens, city and State of New York, have invented certain new and useful Improvements in the Art of Extracting Rubber without Solvents, of which the following is a specification.

My invention relates to the extraction or separation of rubber or rubber-like substances from their vegetable sources without the use of solvents. My invention also comprises the further treatment of the products thus obtained with an alkaline solution or alcohol whenever it is desired to remove certain substances, as resin, therefrom.

The scope of the invention is defined by the appended claims.

As is well known, rubber and rubber-like substances are to be found in a great variety of plants. Some of these plants yield a plentiful supply of rubber-bearing sap or milk, from which the rubber is ordinarily obtained by a very slow and laborious process—*i. e.*, by coating some object with the sap by immersion therein and then coagulating the same in the smoke of a fire. There are other rubber-bearing plants which resemble shrubs and do not yield a free supply of sap. It is possible, however, to extract the rubber from such plants by macerating and treating them with a solvent for the rubber-like gum which they contain or with an alkali, which dissolves or separates the woody fibers and liberates the gum, as pointed out in my application, Serial No. 114,082, filed July 2, 1902. I have discovered, however, that the rubber may be removed from the sap or milk of rubber-bearing plants or directly from rubber-bearing shrubs without the use of any solvents or chemical means or heat for coagulating the sap.

According to the method employed by me in case rubber-bearing shrubs are used they are preferably first crushed or ground, and as the percentage of rubber obtained increases with the degree of fineness to which the particles are reduced it is evident that the best results will be obtained when the shrubs are ground very fine. I prefer to soften the fibers and cellular tissue of the particles of shrub by means of water, either hot or cold or in the form of steam, which may be either at a normal temperature or superheated. It is, however, immaterial whether the shrub be first crushed or ground and then softened, or first softened and then crushed or ground. I then subject the softened particles of shrub, or in case a rubber-bearing sap is used the sap itself, to the action of any suitable apparatus which will thoroughly rub the material treated, at the same time pressing upon it, the pressure, however, being merely such as is incidental to the rubbing. Such action causes the minute particles of rubber or rubber-like gum which are contained therein to coalesce or cohere and form masses which are large enough to be easily separated from the refuse. These masses may then be washed and rolled into sheets of rubber. In case the material treated consists of ground or macerated shrubs the product obtained ordinarily contains a considerable proportion of resin. Such a product is well adapted for many of the uses to which crude rubber is put and may be used as such. In case, however, it is desired to get rid of the resin and to obtain a rubber product free from resin the small masses of gum obtained from the rubbing apparatus may be treated with an alkaline solution or with alcohol, either ethyl or methyl, preferably hot, which rapidly dissolves out the resin and leaves the rubber in a remarkably-pure condition. The solution of resin having been strained off, the pure rubber may be washed and rolled into sheets by well-known forms of apparatus.

Figures 1 and 2 of the accompanying drawings show in sectional elevation suitable forms of apparatus for carrying out my invention, though it will be understood that the invention may be carried out by means of any other apparatus which may be adapted thereto. Figs. 3 and 4 are detail views.

1 represents a boiling-tank supplied with water from the pipe 2 and provided with a steam heating-coil 3 and a steam agitating-coil 4. The tank having been nearly filled with water brought to a boiling-point, the particles of ground shrub are introduced from the chute 5 in about the proportion of one pound of shrub to two gallons of water. The mixture is boiled for some time—say half an hour—and at the same time is constantly agitated by the steam from the coil 4. This softens the shrub particles sufficiently and at the same time probably coagulates or toughens the rubber particles contained therein so that they readily yield to the application of my invention. The softening of the shrub particles may be accomplished by treating the same with cold water instead of hot, but for a much longer period. By this treatment, however, the rubber is not rendered so readily separable as when the hot-water treatment is used. Steam may also be used for softening the shrub particles, if desired.

6 and 7 are outlet-pipes for the mixture in the tank, the pipe 6 being used first in order to reduce the head on pipe 7. The mixture flows through the numerous apertures 8 of the pipes 6 or 7 and is received upon an endless belt strainer and conveyer 9, which may be of cheesecloth $9^a$, supported by wire-cloth $9^b$, of large mesh, supported at its edges by endless chains. The water passes through the strainer into a trough 10, while the shrub particles are carried along to the separator 11, the scraper 12 and sprinkler 16 serving to detach all adhering matter from the strainer.

The separator 11 is fully shown, described, and claimed in my application for United States patent filed August 20, 1902, Serial No. 120,367. Briefly, it may be said to comprise a good-sized drum 15, whose periphery is tightly and smoothly covered with a band of preferably thick rubber belting $15^a$, whose outer surface is slightly roughened or corrugated. An apron 13, of similar rubber belting roughened on its concave surface, surrounds a portion of the periphery of the drum and may be drawn up against the same as tightly as desired by means of the turn-buckles 14. The upper portion of the apron and the drum form a hopper, into which the rubber-bearing material drops from the conveyer 9. The drum 15 is rotatably supported and is driven from any suitable source of power. The rotation of the drum draws the material in between the drum and the apron. Guards 17, placed at the ends of the drum, prevent any escape of the material in that direction, and the effect is that the material is thoroughly rubbed by the roughened surfaces of the parts 13 and 15 and is at the same time subjected to the pressure which is incidental to such rubbing as it is carried around between them. The final result of this action is that the small particles of rubber coalesce or unite with each other and emerge at the point 18 in long rolls, suggesting angle-worms in appearance. The refuse woody fiber, cellular tissue, &c., also comes out at 18 and under proper conditions of pressure and dimensions of drum and apron has been practically denuded of all rubber-like gum and resin. I have obtained very good results with a drum six feet in diameter, an apron nine feet in length, and moderate pressure between the drum and apron. The rubber and refuse on leaving the drum are deposited upon the conveyer and strainer 19. This may be of copper or brass wire-cloth of large enough mesh to allow the refuse to be washed through by the water from the sprinkler 20 into the trough 21, while the rolls of rubber are carried along and dropped or scraped off into the washing-tank 22, which may be of any well-known construction. After being washed the rubber may be rolled into thin sheets by rollers 23 and after drying is in a marketable condition. Instead of allowing the rubber to drop from the conveyer 19 into the tank 22 it may be deflected by a deflector 24, which may either be adjusted away from the conveyer to allow the rubber to pass, or may be placed near the conveyer to deflect all or any desired proportion of the rubber to one side for further treatment.

In case it is desired to obtain a grade of rubber which is free from resin the rubber product which is obtained upon the conveyer 19 may be subjected to a further treatment in the apparatus shown in Fig. 2. 25 represents a steam-jacketed kettle, into which is placed, by preference, an alkaline solution, which may be a ten-per-cent. solution of sodium hydrate, the strength of the solution varying according to the percentage of resin carried by the rubber. Instead of an alkaline solution for dissolving the resin, however, alcohol, preferably wood-alcohol, may be used. The solvent is brought to a boiling-point and the gum to be treated is then introduced. After boiling for about half an hour with constant stirring the resin is completely dissolved, while the rubber is undissolved, but is broken up into small particles or fragments, and the contents may be drawn off through the discharge-pipe 26 and emptied upon the strainer 27. The solution of alkali and resin passes through the strainer into the trough 28 and may be used as a valuable by-product, or in case alcohol is used as the solvent it may be afterward distilled off from the resin and recovered for further use by any of the means well known in the art. The deresinated rubber is carried by the traveling strainer under the sprinkler 29 to the washing-tank 30 and is afterward rolled into sheets. In case, however, it has been too completely disintegrated in the deresinating process to be readily rolled it may be passed through an apparatus precisely similar to the separator 11, except that it may be smaller, and from such apparatus to the washer, or if it is freely sprinkled with cold water upon the conveyer leading from said apparatus it may be put through the rolls without any washing in the washer.

Having thus fully described my invention, what I claim, and desire to secure by Letters Patent, is—

1. The art of extracting rubber or rubber-like substances from materials containing particles of such substances intermingled with substances of a different character, which consists in causing the rubber or rubber-like particles to cohere into masses of appreciable size by means of combined rubbing and pressure, substantially as described.

2. The art of extracting rubber or rubber-like substances from materials containing particles of such substances intermingled with substances of a different character, which consists in causing the rubber or rubber-like particles to cohere into masses of appreciable size, by means of combined rubbing and pressure, and then separating the said masses from the refuse, substantially as described.

3. The art of extracting rubber or rubber-like substances from vegetable sources, which consists in softening the fibers thereof by means of water or steam and then causing the rubber or rubber-like particles to cohere into masses of appreciable size by means of combined rubbing and pressure, substantially as described.

4. The art of extracting rubber or rubber-like substances from vegetable sources, which consists in softening the fibers thereof by means of water or steam, causing the rubber or rubber-like particles to cohere into masses of appreciable size by means of combined rubbing and pressure, and then separating the said masses from the refuse, substantially as described.

5. The art of extracting rubber or rubber-like substances from rubber-bearing material, which consists in subjecting the said material to combined rubbing and pressure, substantially as described.

6. The art of extracting rubber or rubber-like substances from plants, which consists in softening the fibers thereof by means of water or steam, and then subjecting the same to combined rubbing and pressure, substantially as described.

7. The art of extracting rubber or rubber-like substances from rubber-bearing material, which consists in subjecting the said material to combined rubbing and pressure, whereby the rubber-like substances and resin are separated from other materials, and then dissolving the resin from the extracted mass, substantially as described.

8. The art of extracting rubber or rubber-like substances from plants, which consists in softening the fibers thereof by means of water or steam, subjecting the same to combined rubbing and pressure, whereby the rubber-like substances and resin are separated from other materials, and then dissolving the resin from the extracted mass, substantially as described.

9. The art of extracting rubber or rubber-like substances from rubber-bearing material, which consists in subjecting the said material to combined rubbing and pressure, whereby the rubber-like substances and resin are separated from other materials, and then dissolving the resin from the extracted mass by means of an alkaline solution or alcohol, substantially as described.

10. The art of extracting rubber or rubber-like substances from plants, which consists in softening the fibers thereof by means of water or steam, subjecting the same to combined rubbing and pressure, whereby the rubber-like substances and resin are separated from other materials, and then dissolving the resin from the extracted mass by means of an alkaline solution or alcohol, substantially as described.

In witness whereof I have hereunto set my hand this 19th day of August, 1902.

WM. A. LAWRENCE.

Witnesses:
MACDONALD DE WITT,
DELOS HOLDEN.